Figure 1:
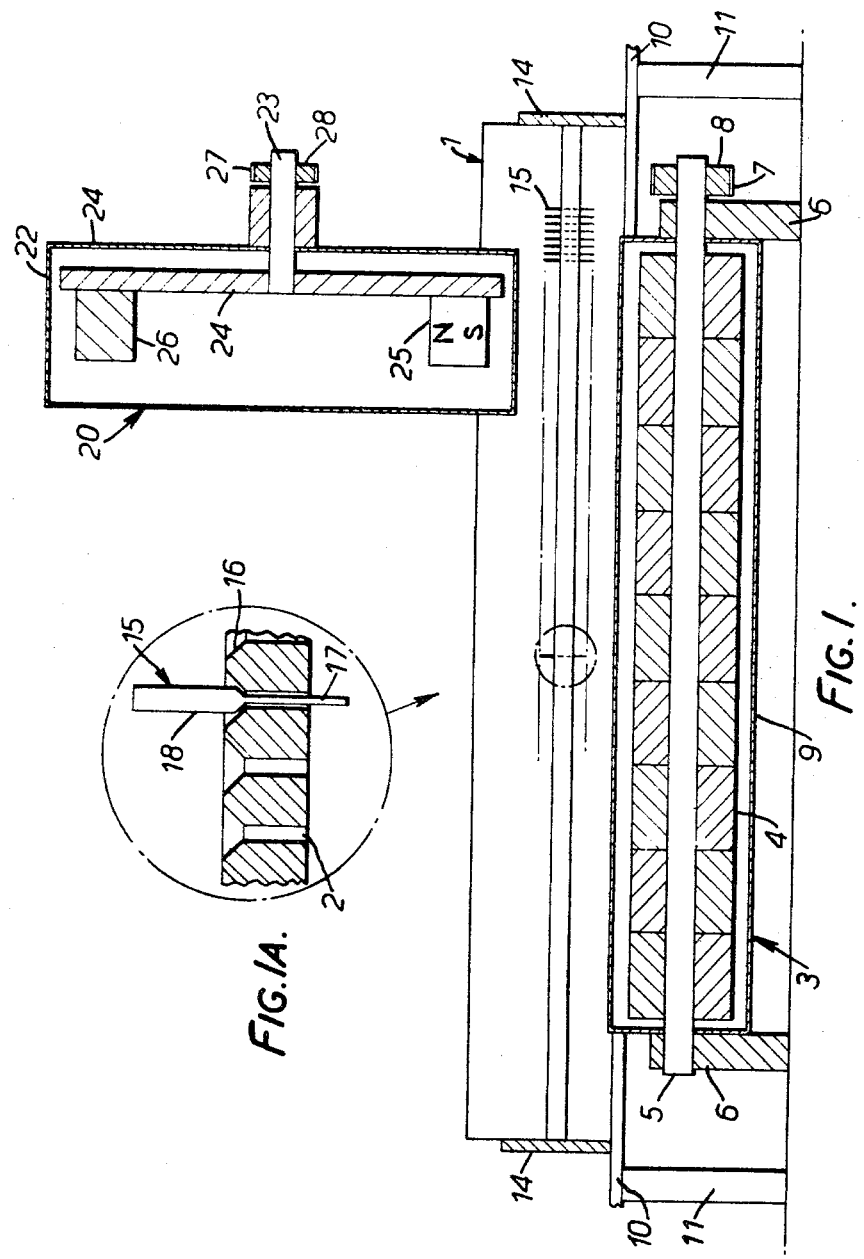

United States Patent [19]

McCulloch

[11] 3,754,313

[45] Aug. 28, 1973

[54] LOCATING ELONGATE MAGNETIC-ELEMENTS

[76] Inventor: Malcolm William McCulloch, 2 Phillip Ave., Swanley, England

[22] Filed: Dec. 6, 1971

[21] Appl. No.: 205,231

[30] Foreign Application Priority Data
Dec. 9, 1970  Great Britain.................. 58,425/70

[52] U.S. Cl................. 29/203 P, 29/211 M, 29/428
[51] Int. Cl. ... H05k 13/04, B23q 7/10, B23p 19/00
[58] Field of Search..................... 29/203 P, 211 M, 29/428, 203 B; 269/8

[56] References Cited
UNITED STATES PATENTS

| | | | |
|---|---|---|---|
| 2,334,004 | 11/1943 | Herzog | 29/211 M |
| 3,061,919 | 11/1962 | Tack | 29/428 |
| 3,386,156 | 6/1968 | Griesemer | 29/203 P X |

Primary Examiner—Thomas H. Eager
Attorney—Samuel Scrivener, Jr. et al.

[57] ABSTRACT

A machine for locating reed relay contact elements in holes in an operable trough which opens to allow the reed elements to drop out of it comprises magnets mounted for rotation below the trough so that the reed elements rotate under the influence of the magnetic field from the magnets and thereby locate in the holes in the trough. A further rotating magnet structure is mounted over the magnets and above the trough to remove, on movement of the trough between it and the magnets, any reed elements that are not located in holes in the trough.

10 Claims, 3 Drawing Figures

LOCATING ELONGATE MAGNETIC-ELEMENTS

This invention relates to locating elongate magnetic-elements. The term magnetic-elements as used herein includes any element fabricated from material responsive to magnetism.

It is an object of the invention to locate elongate magnetic-elements in holes or recesses.

According to one aspect of the invention a method of locating elongate magnetic elements in holes or recesses comprises subjecting the elements to a rotating magnetic-field whereby said elements are constrained to rotate and locate in said holes or recesses.

A trough may be provided having the holes or recesses extending through its base and having its sides inclined upwardly from its base so as to facilitate rotation of the elements therein.

Collector means may be provided to remove non-located elements from the trough.

This aspect of the invention is particularly although not exclusively suited to use in a stage in the manufacture of certain types of reed-relays.

One type of reed-relay has a soft-iron reed element having a flexible contact element of rectangular cross-section and a terminal portion of circular cross-section. During the manufacture of such elements it is necessary for the contact end to be plated. It is therefore a requirement prior to plating that the elements are orientated so that the contact ends all face in one direction. This invention therefore sets out to provide inter alia a method that can be used for so orientating the elements.

According to a further aspect of the invention an apparatus for locating elongate magnetic-elements comprises a trough, element locating means in the bottom of the trough and means for providing a rotating magnetic field in the region of the trough for rotating in use of the apparatus elements placed in the trough.

A collector means may be provided for removing from the trough any magnetic elements that are not located in the locating means of the trough as a consequence of action of the rotating magnetic field. The collector means may be magnetic and may comprise a drum containing a rotating magnet positioned above the trough.

The rotating magnetic field for orientation of the elements may be generated by means of permanent magnets mounted closely adjacent the trough and are preferably directly below the trough.

The element locating means of the trough may comprise holes or recesses extending through the bottom of the trough. The trough may be of a split configuration arranged so that it opens along the bottom thereof so that elements located in the holes or recesses can be released to fall through the bottom of the trough. The trough may be made of material such as brass and may have its inside surfaces chrome-plated. The trough may have V-shaped cross-section and its sides may be inclined at an angle of approximately 120°.

The trough may be mounted on a conveyor and may be traversed along its longitudinal axis through the rotating magnet field.

The rotational speed of the rotating magnetic field and the traversing speed of the trough is preferably predetermined so that all of the locating means of the trough are filled with the elongate elements and the rotational speed and position of the collector means is also preferably predetermined to ensure that it picks up all the elongate elements not located in the locating means, i.e., holes or recesses by the action of the rotating magnetic field.

Figure 2:
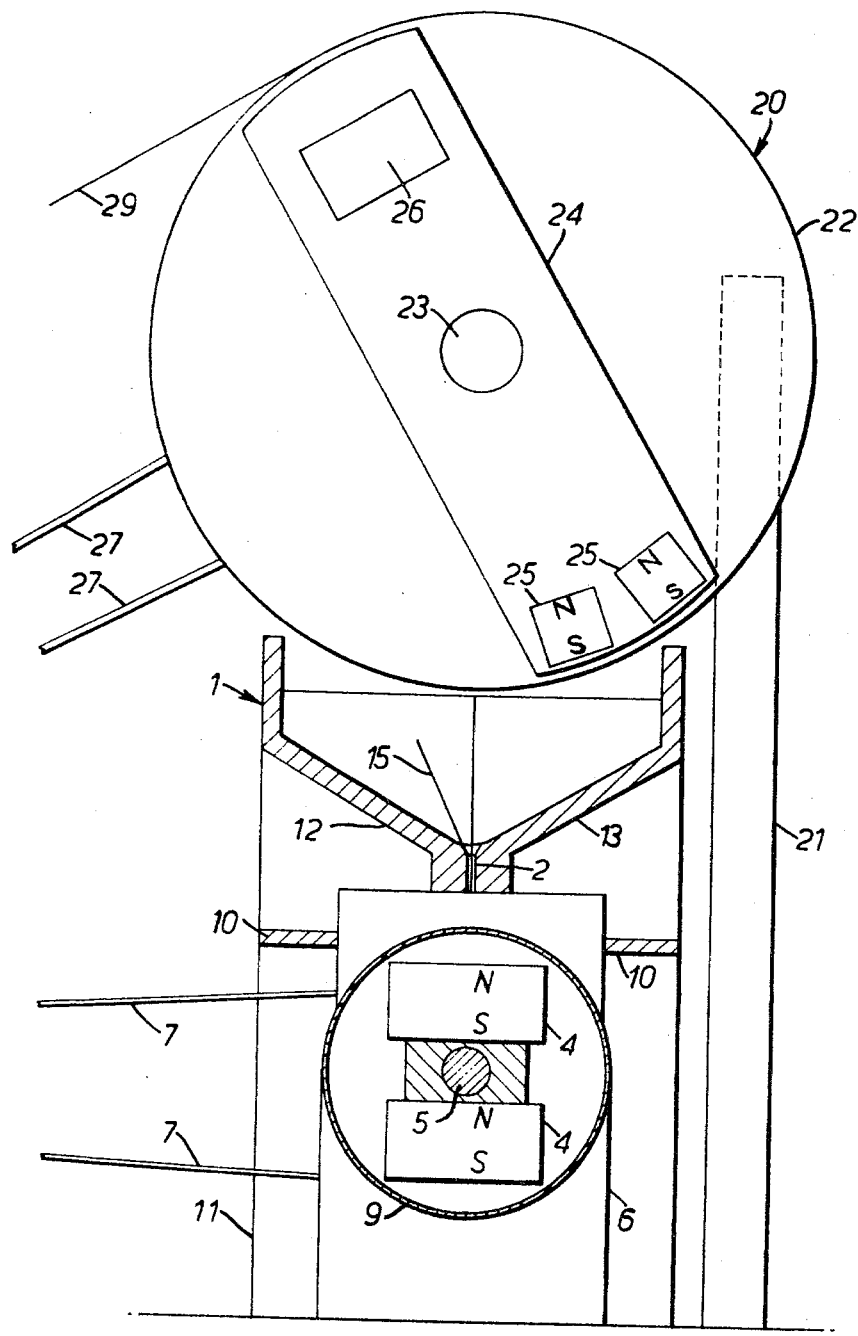

The invention will now be described by way of example with reference to the accompanying drawings in which:

FIG. 1 shows a sectional side elevation of a reed relay reed element aligning and locating machine, FIG. 1A is a view of part of FIG. 1 to an enlarged scale, showing a located reed, and FIG. 2 shows a cross-section on A—A of the machine of FIG. 1.

Briefly, the reed relay reed element aligning machine comprises a chrome-plated brass trough 1 which has reed element locating holes 2 along its longitudinal axis, supported above a rotating magnetic field generating structure 3.

The rotating magnetic field generating structure comprises two parallel rows of sintered ferrite permanent magnets 4 secured on opposite sides of a rotatable shaft 5 these magnets being magnetised such that their north/south axis is perpendicular to the longitudinal axis of the shaft 5. The two rows of magnets are arranged so that one outside surface is a north pole and the opposite outside surface is a south pole thus if a reed relay element of soft iron material is supported over the magnets it will turn end over end when the magnets are rotated. It will be readily appreciated that each row of magnets could be replaced by a single bar of magnetic material having its poles aligned in the same manner.

The shaft 5 is mounted at each end in supporting bearings 6 and is rotated by a belt drive 7 through a pulley 8 attached to the shaft. The magnets are covered by a tube 9 which prevents magnetic material being attached to them.

The trough 2 is carried on a conveyor 10, supported by conveyor supports 11, (only two of which are shown) and the conveyor is driven so that the trough will progressively pass from left to right (in FIG. 1) over the magnets 4 and through their magnetic field. The trough is generally V-shaped and has its sides 12, 13 inclined at an inclusive angle of approximately 120° and comprises a fixed trough side 12 and a movable trough side 13 assembled between two end plates 14. A row of closely spaced holes 2 (shown only in FIG. 1A for clarity) are positioned at the centre of the trough and formed half in each side. The reed relay elements comprise a terminal part 17 of circular cross section and a contact part 18 of a rectangular cross section which is of greater width than the diameter of the terminal part, the diameter of the holes 2 being such as to permit the terminal of the relay element to enter therein. To facilitate the entry of the terminal into the hole, the hole is provided with a tapered lead-in portion 16 thereby ensuring rapid location of the relay elements in the holes on rotation of the magnets. Contamination of the relay elements by pickup when rubbing against the surface of the trough is obviated due to the chrome plating on the sides of the trough. The speed of movement of the conveyor and the rotational speed of the rotating magnet structure are both predetermined to ensure that all of the holes in the trough have reed elements located therein. A magnetic collector arrangement is provided to collect the reed relay elements that have not been located in the holes 2. The collector is mounted so that the trough can pass underneath it, and is located within the influence of the rotating magnet structure 3. The collector comprises a cylindrical drum 22 fastened to a support 21 and a rotatable shaft 23 extends through an end wall 24 of the drum 22 and an arm 24 is attached to the shaft 23 inside the drum. The arm 24 carries two magnets 25 on one end and a balancing weight 26 on its other end. The shaft 23 is rotated by the belt drive 27 to the pulley 28.

The magnets are arranged with their polar axis perpendicular to the axis of rotation of the member, so that on passing over the trough they pickup any unlocated reed elements 15 in the trough 1 and transfer them around the outside of the drum and out of the chute 29 for collection and re-supply to a trough.

The belts 7 and 27 may both be driven from the same drive mechanism individually geared to give rotational speeds at an optimum for the size of the various elements to firstly ensure location of the reed elements in the holes in the trough and secondly to ensure removal of all the unlocated or loose reed elements from the trough.

If desired the structure 20 could be mounted so that the outlet chute 26 is over the trough 1 thereby permitting the excess number, i.e., the loose reed elements to be deposited into the trough or a subsequent trough on the conveyor, a suitable gate mechanism being provided if required, this may then form part of a delivery means for the reed elements to the trough.

Subsequent to the alignment of the reed elements in the locating holes in the trough the trough may be removed from the conveyor and positioned over a clamping and holding device. When so positioned the movable portion of the trough is opened and the reed elements fall into the holding device and are held therein by a clamping means to enable a subsequent operation such as electro-plating to be carried out on the contacts.

What we claim is:

1. A method of locating elongate magnetic elements in holes or recesses comprising subjecting the elements to a rotating magnetic field whereby said elements are constrained to rotate and locate in said holes or recesses.

2. Apparatus for carrying out the method of claim 1, comprising a trough, element locating means in the bottom of the trough and means for providing a rotating magnetic field in the region of the trough for rotating in use of the apparatus elements placed in the trough.

3. Apparatus as claimed in claim 2, wherein collector means are provided for removing from the trough any magnetic elements that are not located in the locating means of the trough as a consequence of the rotating magnetic field.

4. Apparatus as claimed in claim 3, wherein the collector means comprises a drum positioned above the trough containing a rotating magnet arrangement.

5. Apparatus as claimed in claim 2 wherein the rotating magnetic field for orientation of the elements is generated by means of permanent magnets mounted closely adjacent and beneath the trough.

6. Apparatus as claimed in claim 2, wherein the said locating means comprises holes or recesses extending through the bottom of the trough.

7. Apparatus as claimed in claim 6, wherein the trough is of split configuration and arranged so that it opens along the bottom thereof thereby to enable elements located in the holes or recesses to be released to fall through the bottom of the trough.

8. Apparatus as claimed in claim 7, wherein the trough is of V-shape cross section and the sides thereof are inclined at an angle of approximately 120°.

9. Apparatus as claimed in claim 2, wherein the trough is mounted on a conveyor and in use of the apparatus is traversed in the direction of its longitudinal axis through the rotating magnetic field.

10. Apparatus for locating magnetic reeds or similar elongate magnetic elements in holes or recesses comprising a trough of generally V-shaped cross section, element locating means having defined therein holes or recesses for receiving said reeds or said elements said locating means being provided in the root of the generally V-shaped trough, and rotating magnetic field producing means positioned in the region of the trough for providing a magnetic field rotatable for constraining the said reeds or elements to rotate and to be located in the said holes or recesses.

* * * * *

UNITED STATES PATENT OFFICE
CERTIFICATE OF CORRECTION

Patent No. 3,754,313  Dated August 28, 1973

Inventor(s) Malcolm William McCulloch

It is certified that error appears in the above-identified patent and that said Letters Patent are hereby corrected as shown below:

The Assignee: Plessey Handel und Investments A.G., Zug, Switzerland, a Swiss Company Signed and sealed this 29th day of January 1974.

(SEAL)
Attest:

EDWARD M. FLETCHER, JR.
Attesting Officer

RENE D. TEGTMEYER
Acting Commissioner of Patents